United States Patent [19]

Takeuchi et al.

[11] Patent Number: 5,235,262
[45] Date of Patent: Aug. 10, 1993

[54] MOTOR CONTROL APPARATUS FOR CONTROLLING THE POSITION OF A MOTOR-DRIVEN OBJECT

[75] Inventors: Tsuneto Takeuchi; Takashi Katagiri, both of Nagano, Japan

[73] Assignee: K.K. Sankyo Seiki Seisakusho, Nagano, Japan

[21] Appl. No.: 830,349

[22] Filed: Jan. 31, 1992

[30] Foreign Application Priority Data

Feb. 1, 1991 [JP] Japan .................................. 3-33616
Jan. 7, 1992 [JP] Japan .................................. 4-18498

[51] Int. Cl.$^5$ ............................................ G05D 3/18
[52] U.S. Cl. .................................... 318/603; 318/609; 318/799; 318/808
[58] Field of Search ............... 318/603, 609, 610, 808, 318/799; 388/912, 928.1

[56] References Cited

U.S. PATENT DOCUMENTS

| | | | |
|---|---|---|---|
| 4,266,168 | 5/1981 | Andersen | 318/331 |
| 4,284,942 | 8/1981 | Bigley et al. | 318/615 X |
| 4,498,037 | 2/1985 | Razavi | 318/617 X |
| 5,089,758 | 2/1992 | Sogawa | 318/603 |

*Primary Examiner*—William M. Shoop, Jr.
*Assistant Examiner*—Brian Sircus
*Attorney, Agent, or Firm*—Sughrue, Mion, Zinn, Macpeak & Seas

[57] ABSTRACT

A motor control apparatus composed of a first pulse multiplier circuit for multiplying command pulses by a first factor, encoder circuit for detecting a position of a motor-driven object, a second pulse multiplier circuit for multiplying a detection pulse from the encoder circuit by a second factor, a deviation counter circuit for detecting a difference between output pulses of the first and second multipliers, a divider circuit for dividing an output signal of the deviation counter by the second factor, and driving source driven by the control apparatus in accordance with an output of the divider.

8 Claims, 5 Drawing Sheets

MOTOR CONTROL APPARATUS FOR CONTROLLING THE POSITION OF A MOTOR-DRIVEN OBJECT

BACKGROUND OF THE INVENTION

This invention relates to an apparatus for controlling the position of a motor-driven object by driving the motor in accordance with the number of input command pulses.

Apparatuses are known that control the position of a motor-driven object by driving the motor in accordance with the number of input command pulses.

FIG. 7 shows a conventional motor control apparatus. The apparatus shown in FIG. 7 consists of three basic units, a position control unit 50, a speed control unit 70 and a current control unit 80. The position control unit 50 is supplied with command pulses that direct the motor to rotate either clockwise or counterclockwise. The position control unit 50 comprises a first multiplier 51 that multiplies the input command pulses by a factor of $G_1$, a second multiplier 65 that multiplies the feedback pulses from a rotary encoder 63 (to be described below) by a factor of $G_2$, a deviation counter 52 that counts the difference between the number of command pulses and feedback pulses multiplied by the multipliers 51 and 65, respectively, a divider 53 with which the difference obtained by the counter 52 is divided by C, a digital/analog converter 54 that converts the output of the divider 53 to an analog command signal B, a feed-forward pulse generator 55 that generates feed-forward control pulses in response to the input command pulses, a frequency/voltage converter 56 that converts the generated feed-forward pulses to a voltage signal A representing the amount of feed-forward, and an adder 57 that adds the feed-forward signal A to the analog command signal B, producing the sum as a speed command signal. The multiplication factors of the multipliers 51 and 65, as well as the division factor of the divider 53 are preset by means of switches.

The speed control unit 70 comprises a frequency/voltage converter 64 that converts a feedback signal from the rotary encoder 63 to a voltage signal, a subtractor 58 that outputs a signal representing the difference between the speed command signal and the value of voltage as obtained by conversion from the feedback signal through the frequency/voltage converter 64, and a speed detecting operational amplifier 59 that performs an arithmetic operation on the output signal from the subtractor 58, outputting the result as a current command signal.

The current control unit 80 comprises: a current detecting operational amplifier and PWM section 61 that performs an arithmetic operation on the applied voltage on a motor 62 in response to the supplied current command signal and which converts the voltage to a corresponding duty; the motor 62 which is driven with the current detecting operational amplifier and PWM section 61; and the rotary encoder 63 which outputs a pulse signal in accordance with the rotating speed and position of the motor 62. The motor 62 drives a motor-driven object (not shown). As already mentioned, an output signal from the rotary encoder 63 is supplied to both the feedback pulse multiplier 65 and the frequency/voltage converter 64 as a feedback signal.

The command pulse multiplier 51, feedback pulse multiplier 65, deviation counter 52, divider 53 and feed-forward pulse generator 55 in the position control unit 50 are composed as an application specific integrated circuit (ASIC) 60. Therefore, the operation of multiplying the command pulses and feedback pulses are both accomplished by hardware.

Suppose here that input command pulses are supplied for directing the motor to rotate either clockwise or counterclockwise. The command pulses are fed to the feedforward pulse generator 55 where feed-forward control pulses are generated; at the same time, the command pulses are fed to the pulse multiplier 51 where they are multiplied by a factor of $G_1$. The detection pulses from the encoder 63 are fed to the pulse multiplier 65 where they are multiplied by a factor of $G_2$. The command pulses multiplied by $G_1$ and the output of encoder 63 as multiplied by $G_2$ are fed to the deviation counter 52 for detecting the difference between the two inputs. The deviation counter 52 counts the difference between the numbers of command pulses and feedback pulses and outputs the result. The output signal from the deviation counter 52 is divided by C in the divider 53 and the result is then converted to a command signal B in the digital/analog converter 54. The feed-forward control pulses generated by the generator 55 are fed to the frequency/voltage converter 56 where they are converted to a voltage signal A representing the amount of feed-forward. This feed-forward signal A is added to the command signal B and the sum is delivered as a speed command signal.

The speed command signal is fed to the operational amplifier 59 where an arithmetic operation is performed to obtain a current command signal. In response to this current command signal, the current detecting operational amplifier and PWM section 61 drives the motor 62. The rotating position and speed of the motor 62 are detected with the rotary encoder 63 and the detection signal is fed back to the deviation counter 52 while, at the same time, the signal is converted to a voltage signal in the frequency/voltage converter 64. The difference between the resulting voltage signal and the speed command signal is determined by the subtractor 58 and the resulting difference signal is fed to the operational amplifier 59 where an arithmetic operation is performed to produce an output current command signal. When the motor-driven object has reached the position indicated by the input command pulses, the output from the deviation counter 52 becomes zero, causing the motor 62 to stop with the motor-driven object being registered with the target position. If command pulses of high frequency are fed in abruptly, the feed-forward flow including the feed-forward pulse generator 55 outputs a large speed command signal, whereby the motor 62 is immediately driven by a sufficient amount to insure that the motor-driven object is rapidly brought to the target position.

A motor control apparatus of the type described above is reported by K. Sawai in the "Small AC Servo Motor" in November extra issue of "Kikai Sekkei (Machine Design)", 1987.

In this conventional motor control apparatus, the operations of multiplying command pulses and feedback pulses are both accomplished by hardware and this has presented the following problems:

(1) The factor of multiplication, $G_1$, of command pulses can only be selected from a narrow range of approximately 1–16 because of the limitations on the numbers of bits and switches;

(2) similarly, the factor of multiplication $G_2$ of feedback pulses can be selected only discretely from a narrow range as 1, 2 or 4;

(3) The amount of feed-forward is related to the multiplication factor $G_1$ for command pulses, so there can be the case where the time of response to an abrupt change in the number of command pulses can be satisfactorily shortened; and (4) The open-loop transfer function of the position control loop varies with the multiplication factor $G_2$ for feedback pulses, so a change in $G_2$ will affect the stability of the control operation.

SUMMARY OF THE INVENTION

The present invention has been accomplished under these circumstances and has as an object providing a motor control apparatus that is free from the aforementioned problems.

A first aspect of the invention, the motor controller comprises a first pulse multiplier for multiplying command pulses by a first factor, encoder for detecting a position of a motor-driven object, a second pulse multiplier for multiplying a detection pulse from said encoder circuit by a second factor, a deviation counter for detecting a difference between output pulses of said first and second multipliers, a divider for dividing an output signal of said deviation counter by said second factor and driving source driven by said control apparatus in accordance with an output of said divider.

A second aspect of the present invention, a motor control apparatus comprises a command counter for counting command pulses and outputting a counted value, a first pulse multiplier for multiplying an output of said command counter by a first factor, an encoder for detecting a position of a motor-driven object, a feedback counter for counting detection pulses of said encoder and outputting a counted value, a second pulse multiplier for multiplying said counted value signal of said feedback counter by a second factor, a deviation counter for detecting a difference between output signals of first and second multipliers, a first divider for dividing an output signal of said deviation counter by said second factor, a second divider for dividing an output signal of said first pulse multiplier by said second factor, an adder for adding said output signal of said first divider to an output signal of said second divider and for outputting a speed command and a drive amplifier for controlling a motor connected to said motor-driven object in accordance with said speed command.

In accordance with the present invention, the operations of multiplying command pulses and feedback pulses are both accomplished by software and this allows the apparatus to have the following advantages:

(1) the multiplication factors for command pulses and feedback pulses can be selected from a broad range of, say, 1-9999;

(2) the amount of feed-forward can be related to the multiplication factor for command pulses, so the time of response to an abrupt change in the number of command pulses can be adequately shortened; and (3) since the open-loop transfer function of the position control loop is prevented from varying with the multiplication factor for feedback pulses, one can ensure that a change in that multiplication factor will in no way affect the stability of the control operation.

DESCRIPTION OF THE PREFERRED EMBODIMENTS

Figure 1:
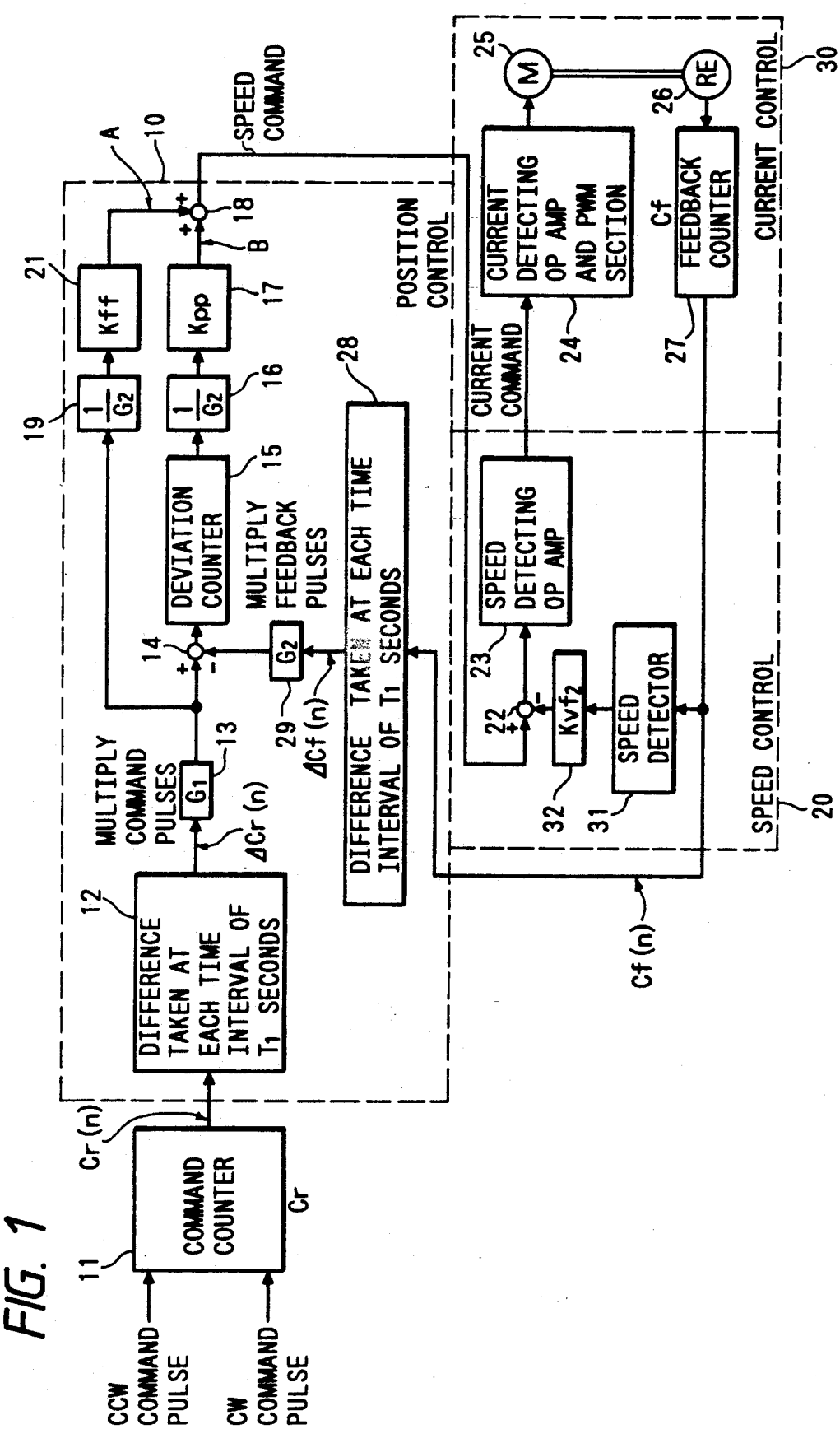
FIG. 1 is a block diagram showing an embodiment of the motor control apparatus of the present invention.
Figure 2:
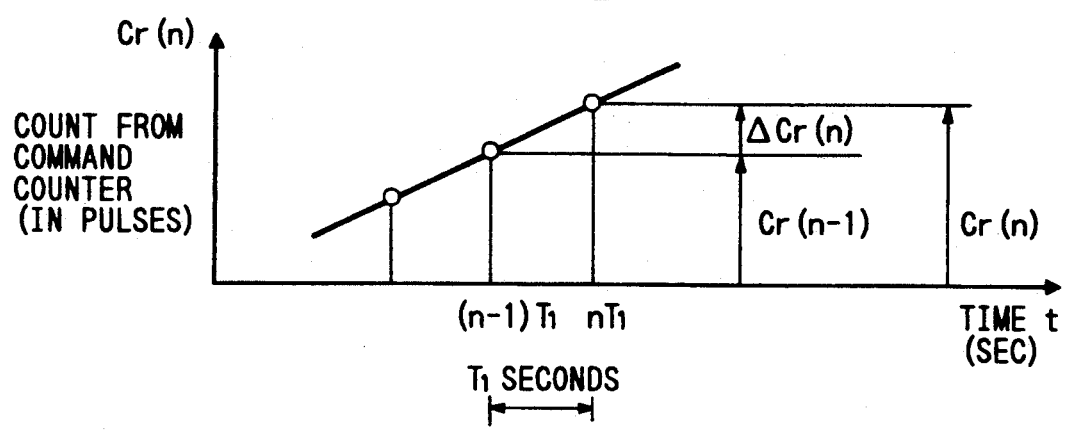
FIG. 2 is a graph showing the operation of the sampling unit in the apparatus of FIG. 1.

The motor control apparatus of the present invention is described below with reference to one preferred embodiment as shown in FIG. 1 and 2.

Referring first to FIG. 1, the motor control apparatus of the present invention comprises three basic units, a position control unit 10, a speed control unit 20 and a current control unit 30. A servo motor 25 contained in the current control unit 30 will drive a motor-driven object (not shown). The servo motor 25 has an encoder 26 for detecting the rotating position of the motor. One can detect the position of the motor-driven object counting the detection pulses from the encoder 26 with a feedback counter 27. The position control unit 10 is supplied with the count obtained by a command counter 11. Each of the command counter 11 and the feedback counter 27 is an up/down counter. The command counter 11 is so connected that it reads a count value $+1$ per input command pulse for rotation counterclockwise and $-1$ per input command pulse for rotation clockwise. The feedback counter 27 is so connected that it performs addition on the detection pulse from the rotary encoder 26 when the motor 25 has rotated counterclockwise and performs subtraction when the motor rotation is clockwise.

The position control unit 10 has a first sampling section 12 that takes the difference of the output from command counter 11 at each time interval of $T_1$ seconds and a second sampling section 28 that takes the difference of the output from feedback counter 27 at each time interval of $T_1$ seconds. With the command counter 11 taken as an example, the sampling operation is described below with reference to FIG. 2. Write $Cr(n)$ and $Cr(n-1)$, respectively, for the present sampling value for the previous sampling taken $T_1$ in seconds before. Here, $Cr(n)-Cr(n-1)$ may be defined as the difference at each time interval of $T_1$ seconds and its value is written as $\Delta Cr(n)$. Depending on the gradient of the straight line shown in FIG. 2, the value of $\Delta Cr(n)$ is either positive or negative or zero. A similar definition may be adopted for the feedback counter 27 and the equation $\Delta Cf(n)=(Cf(n)-Cf(n-1)$.

The position control unit 10 comprises: a first multiplier 13 that multiplies by a factor of $G_1$ the command pulses sampled at each time interval of $T_1$ seconds by the first sampling section 12; a second multiplier 29 that multiplies by a factor of $G_2$ the feedback pulses sampled at each time interval of $T_1$ seconds by the second sampling section 28; a subtractor 14 for determining the different between the number of command pulses and feedback pulses are multiplied by the respective multipliers 13 and 29; a deviation counter 15 that counts the differential output from the subtractor 14; a first divider 16 that divides the deviation count from the count 15 by $G_2$; a first computing means 17 that multiplies the output of the first divider 16 by a constant; a second divider 19 that divides by $G_2$ the command pulses as multiplied by a factor of $G_1$ in the multiplier 13; a second computing means 21 that multiplies the output of the second divider 19 by another constant to produce a feed-forward signal A; and an adder 18 that adds the feed-forward signal A to the command signal B, outputting the sum as a speed command signal.

The speed control unit 20 comprises: a speed detecting section 31 that detects the speed of a motor 25 in response to the feedback signal of from the feedback counter 27; a computing means 32 with which the speed signal detected by the speed detecting section 31 is multiplied by a constant; a subtractor 22 that outputs a signal for the difference between the speed command signal and the feedback signal from the computing means 32; and a speed detecting operational amplifier 23 that performs an arithmetic operation on the output signal form subtractor 22, thereby outputting the result as a current command signal. In the embodiment under consideration, the speed detecting operational amplifier 23 combines with a current detecting operational amplifier and PWM section 24 (to be described just below) to make up a drive amplifier that will drive the motor 25.

The current control unit 30 comprises: the current detecting operation amplifier and PWM section 24 which performs an arithmetic operation on the applied voltage on the motor 25 in response to the applied current command signal and which converts the voltage to a corresponding duty; the motor 25 which is driven with the current detecting operational amplifier and PWM section 24; and the rotary encoder 26 which outputs a pulse signal in accordance with the rotating speed and position of the motor 25.

Figure 3:
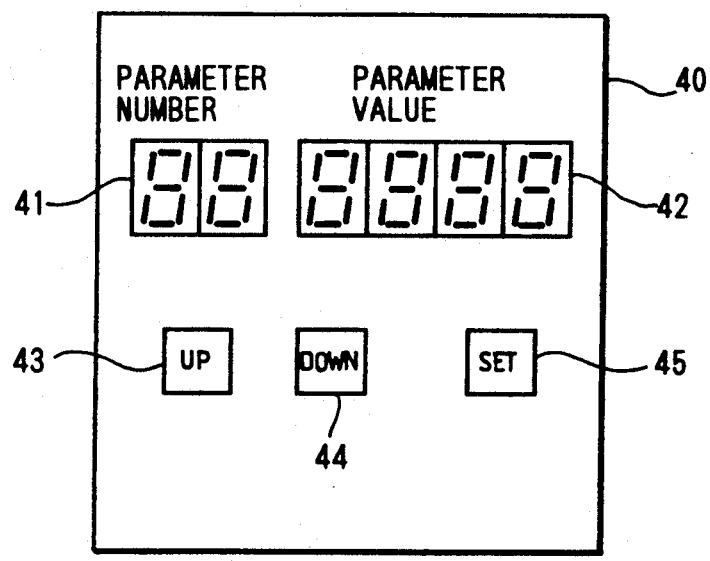
FIG. 3 is a front view of the operating panel used in the apparatus of FIG. 1.

The position control unit 10 and the speed control unit 20 can be composed of a microprocessor and its software can be designed in such a way that the multiplication factors $G_1$ and $G_2$ for the first and second multipliers 13 and 29, respectively, the respective values of the first and second dividers 16 and 19, the factors in association with the first and second computing means 17 and 21 can be present both freely and finely. FIG. 3 shows an exemplary operation unit for setting those various parameters. The operating panel generally indicated by 40 has a parameter number indicator 41 which indicates the type of a selected parameter in terms of numerals, a parameter value indicator 42 which indicates the set value of the parameters, an UP button 43 for incrementing the numeric value, a DOWN button 44 for decrementing the numeric value, and a SET button 45 for registering the set numeric value.

The operation of the embodiment under discussion will proceed as follows. First suppose that command pulses are entered. The command cutter 11 counts the input command pulses and the first sampling section 12 outputs the difference $\Delta Cr(n)$ of the count art each time interval of $T_1$ in seconds. The sampled value is multiplied by a factor of $G_1$ in the first pulse multiplier 13 to yield $G_1 \times \Delta Cr(n)$. Further, the second sampling section 28 outputs the difference at each time interval of $T_1$ in seconds of the feedback pulses that have been detected with the encoder 26 and which have been counted by the feedback counter 27, and the sampled value is multiplied by a factor of $G_2$ in the second pulse multiplier 29 to yield $G_2 \times \Delta Cf(n)$. The deviation counter 15 performs addition (or subtraction depending on sign) on the difference, $G_1 \times \Delta Cr(n) - G_2 \times \Delta Cf(n)$, at each time interval of $T_1$ in seconds between the outputs from the first and second pulse multipliers 13 and 29. The count by the deviation counter 15 is divided by $G_2$ in the first divider 16 and it is further multiplied by a constant (Kpp) in the first computing means 17 to construct a command signal B. In response to this command signal B, the motor 25 is driven by means of the speed control unit 20 and the current control unit 30; when the output from the deviation counter 15 becomes zero, the command signal B also becomes zero, causing the motor 25 to stop. By the sequences of these steps, the motor-driven object (not shown) is controlled to the position associated with the input command pulses.

Thus, the position control unit 10 will control the position or the motor-driven object by controlling the motor 25 in such a way that the deviation counter 15 will read the value zero. Consider here the case where two command pulses are entered for directing the motor to rotate counterclockwise, with the factors of multiplication by the first and second pulse multipliers 13 and 29 being set to $G_1=2$ and $G_2=4$, respectively. Then, the deviation counter 15 will output 4(2 ×2) pulses. The output of the deviation counter 15 is divided by 4 in the first divider 16 to yield a single pulse, which in turn is multiplied by a constant (Kpp) in the first computing means to produce a command signal B which causes the motor 25 to rotate counterclockwise. As the motor 25 rotates counterclockwise, one pulse is fed into the feedback counter 27 for counting and thereafter multiplied by a factor of $G_2$ (=4) in the second pulse multiplier 29 to generate 4 pulses, which are subjected to subtraction in the deviation counter 15, whereupon said counter 15 will read the value "zero", causing the motor 25 to stop. In other words, the motor 25 will rotate by an amount that corresponds to the number of input command pulses times $G_1$ divided by $G_2$. In the case under consideration, the result of this calculation is $2 \times 1/4 = 1$ and the motor 25 will rotate by an amount equivalent to one pulse.

The operation for feed-forward control is described below. The first pulse multiplier 13 is followed by a branch feed-forward loop containing the second divider 19 and the second computing means 21. By passage through them, signal representing the amount of feed-forward is obtained in accordance with the formula $G_1 \times \Delta Cr(n) \times Kff/G_2$ and this signal A is added to the command signal B in the adder 19 to produce a speed command signal. Since the difference at each time interval of $T_1$ seconds is taken before the first pulse multiplier 13, the feed-forward signal A will become constant if the input command pulses to the command counter 11 have a constant frequency. If the frequency of the command pulses varies, the feed-forward signal A will also vary. Take, for example, the case of motor start-up where the rotational speed is increased from 0 to 3000 rpm. Since the frequency of the command pulses varies, the amount of feed-forward will make the transition from zero to a certain value, thereby increasing the value of speed command. As a result, the rotating position of the motor 25 and, hence, the position of the motor-driven object can be controlled rapidly in response to the change in command pulses, thereby making an effective contribution to improvement in the response time of the control apparatus.

Figure 7:
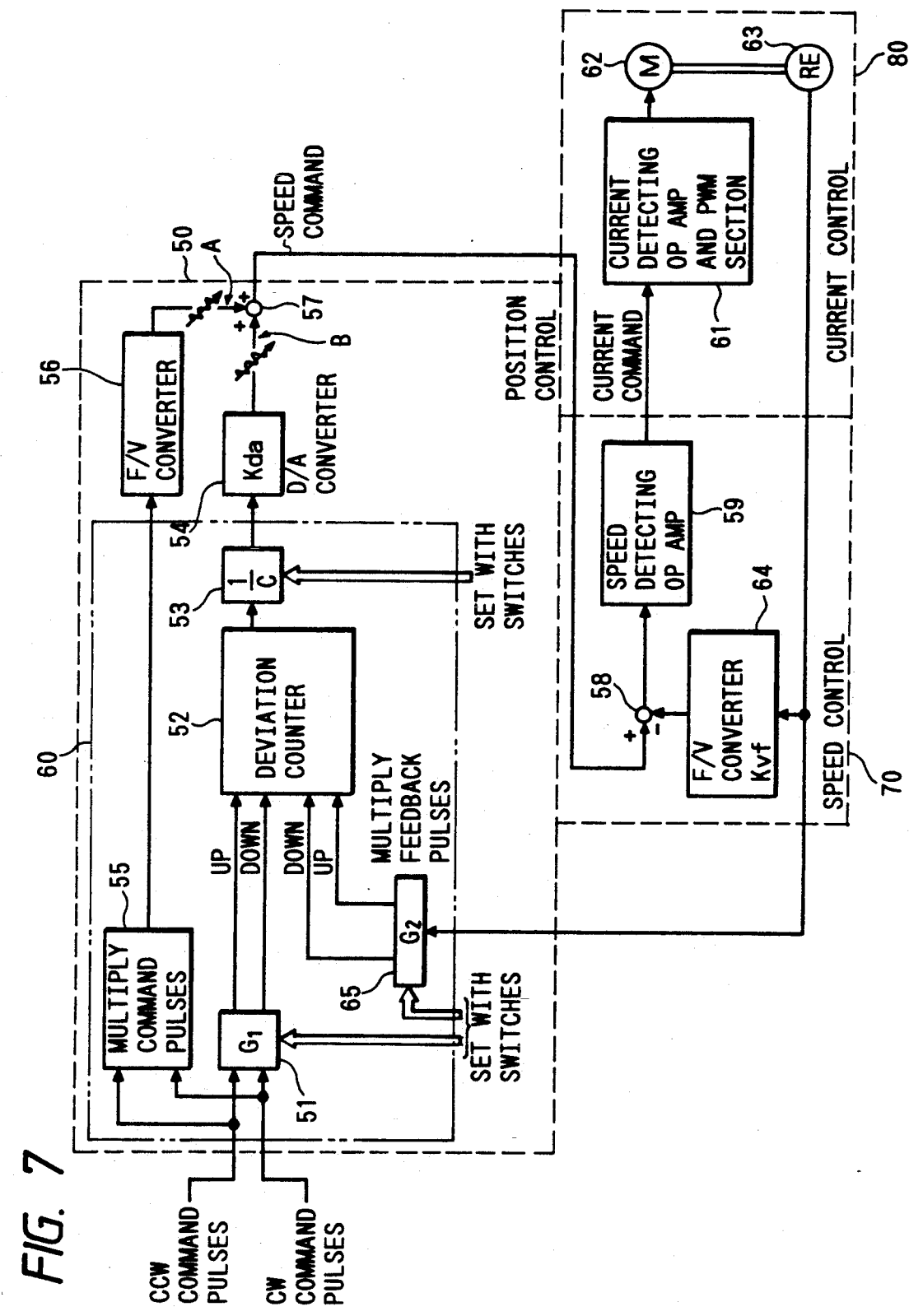
FIG 7 is a block diagram showing a conventional motor control apparatus.

In the conventional motor control apparatus shown in FIG. 7, a branch feed-forward loop is provided at a stage preceding the first pulse multiplier 51 in order to avoid undue complexity in the configuration of an ASIC containing the position control unit 50 and other components. Under the circumstances, a change in the multiplication factor $G_1$ of the first pulse multiplier 51 will affect the ratio of feed-forward signal A to command signal B (A/B) and this has occasionally made it difficult to shorten the time of response to an abrupt change in the command pulses.

In contrast, the position control unit 10 of the apparatus according to the embodiment under discussion is composed of software and, in this case, it is easy to provide a branch feed-forward loop at a stage following the first pulse multiplier 13. As a matter of fact, the first pulse multiplier 13 is followed by the branching of a feed-forward loop in the embodiment under consideration, and the motor control apparatus has a good response characteristic in that a change in the multiplication factor $G_1$ of the first pulse multiplier 13 will not affect the ratio of feed-forward signal A to command signal B.

Composing the position control unit 10 of software has the added advantage that it is easy to provide not only the first divider 16 of the value $1/G_2$ at a stage following the deviation counter 15 but also the second divider 19 of the value $1/G_2$ within the feed-forward loop as in the embodiment shown in FIG. 1. By inserting the first and second dividers 16 and 19, the multiplication factor $G_2$ of the second pulse multiplier 29 will be related to $1/G_2$, or the value preset for each of the first and second dividers. As a result, a change in $G_2$ will in no way affect the ratio of the feed-forward signal A to the command signal (A/B) or the open-loop transfer function, thereby preventing the unwanted change in the position controllability of the motor-driven object that would otherwise occur in response to the change in $G_2$.

The multiplication factors $G_1$ and $G_2$ of the first and second pulse multipliers 13 and 29, as well as the constants Kpp and Kff of the first and second computing means 17 and 21 are set by manipulation with an operating section as shown in FIG. 3. Assume, for example, the case where $G_1$ is assigned parameter number one and $G_2$, parameter number two; then, the operating panel 40 shown in FIG. 3 may be set in such a way that each of $G_1$ and $G_2$ can be selected from a broad range of 1-9999. If desired, parameter values of longer digits can be set by increasing the number of digits available in the parameter value indicator 42 but setting each $G_1$ and $G_2$ to 9999 will suffice for practical purposes. In addition, the number of operational bits for position control has to be increased in association with the values of $G_1$ and $G_2$, so the range of the values of $G_1$ and $G_2$ should not exceed those which are satisfactory for practical applications. The microprocessor not only sets various parameters such as $G_1$ and $G_2$ but also performs control on the position of the motor-driven object; therefore, parameters such as $G_1$ and $G_2$ can be freely used within the limits of software for position control.

In the embodiment under discussion, there are provided the first computing means 17 which multiplies the output of the first divider 16 by a constant, as well as the second computing means 21 which multiplies the output of the second divider 19 by another constant. Such provision of the first and second computing means 17 and 21 for multiplying the outputs of the first and second dividers 16 and 19 by constants is effective in setting the response of the servo system to command pulses at a desired level.

The order of providing the first divider 16 and the first computing means 17 may be reversed. Similarly, the order of providing the second divider 19 and the second computing means 21 may also be reversed.

Figure 4:
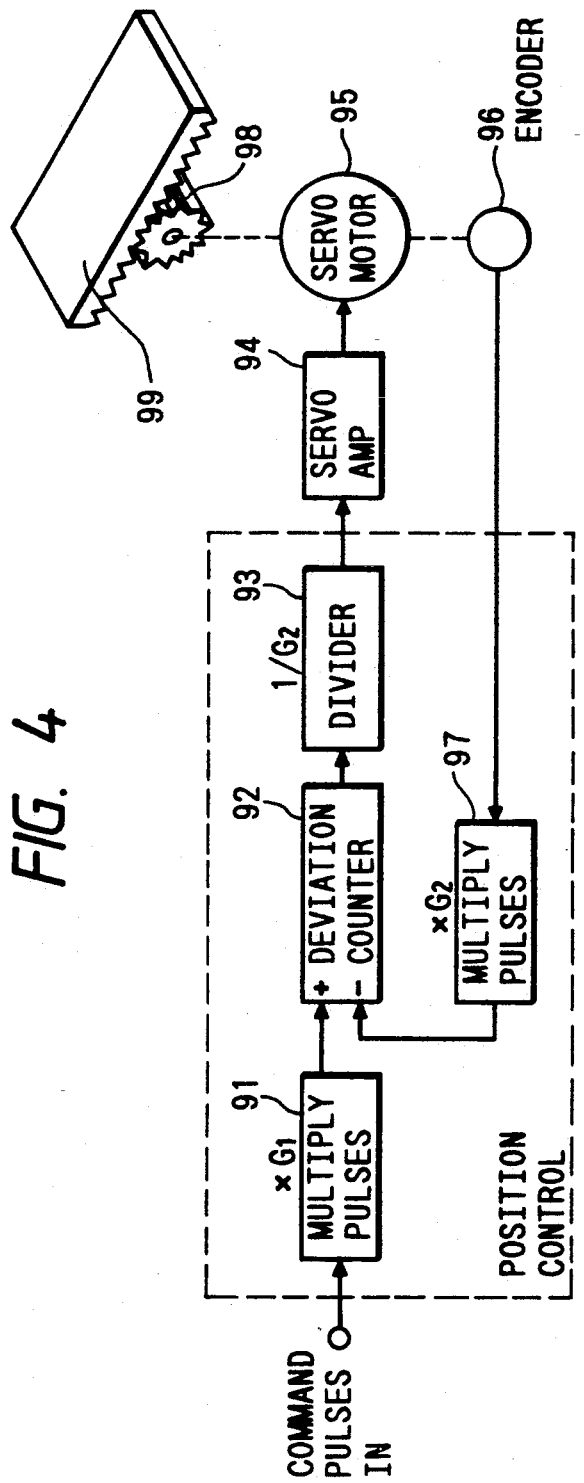
FIG. 4 is a block diagram showing another embodiment of the motor control apparatus of the present invention.
Figure 5:
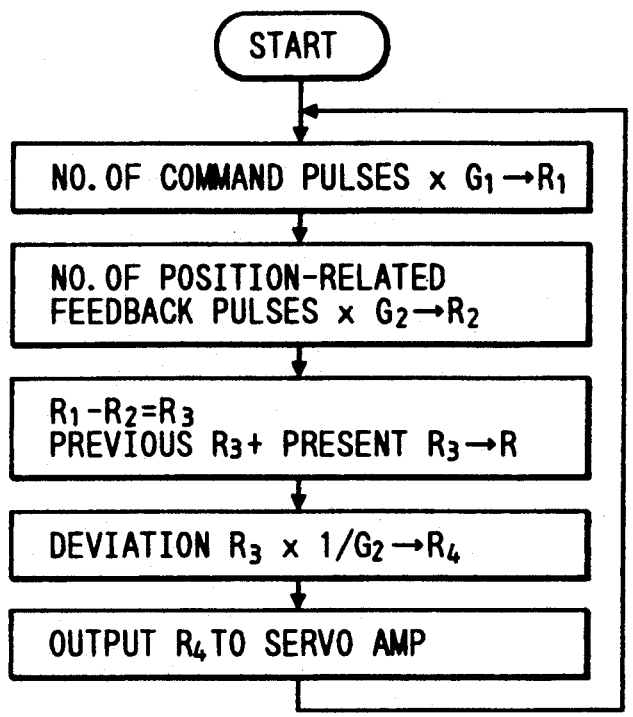
FIG. 5 is a flowchart showing the operation of the apparatus of FIG. 4.
Figure 6:
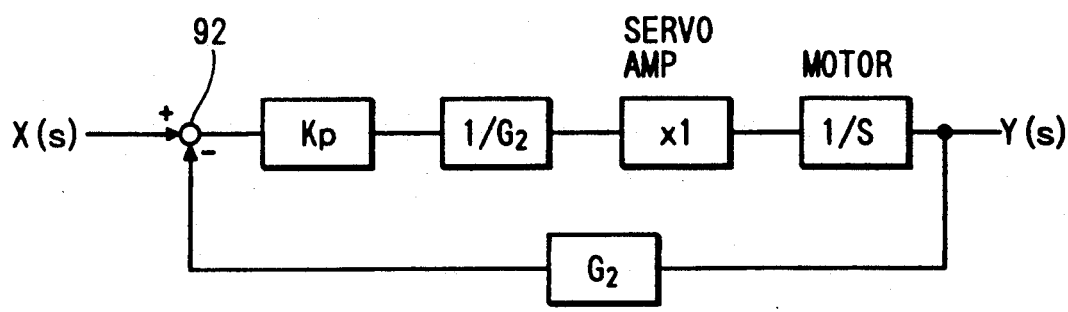
FIG. 6 is a block diagram that models the operation of the apparatus shown in FIG. 4.

We now describe second embodiment of the motor control apparatus of the present invention with reference to FIGS. 4 to 6. As shown in FIG. 4, a servo motor 95 as a drive source is adapted to drive a motor-driven object 99 via a pinion 98 that is rotatably driven by the rotating shaft of the motor. The servo motor 95 has an encoder 96 for detecting its rotating position and the position of the object 99 can be detected by counting the number of detection pulses from the encoder 96.

The servo motor 95 is driven in response to input command pulses, which are first multiplied by a factor of $G_1$ in a pulse multiplier 91. The detection pulses from the encoder 96 are multiplied by a factor of $G_2$ in another pulse multiplier 97. The command pulses multiplied by $G_1$ and the output of encoder 96 which has been multiplied by $G_2$ are fed to a deviation counter 92 where the difference between the two inputs is detected.

In the second embodiment of the present invention, a divider 93 is provided at a stage following the deviation counter 92 so that the deviation signal detected by the counter 92 is divided by $G_2$. In response to the deviation signal divided by $G_2$ in the divider 93, the servo motor 95 is driven with the signal passing through a servo amplifier 94. When the difference between the command pulses multiplied by $G_1$ and the detection pulses from the encoder 96 which have been multiplied by $G_2$ becomes zero, the motor 95 stops rotating, with the motor-driven object 99 being registered with the target position.

The pulse multipliers 91 and 97 as well as the divider 93 can be composed of a microcomputer and the values of $G_1$ and $G_2$ can be set in a free and fine manner by designing appropriate microcomputer software.

The operation of the apparatus according to the second embodiment of the present invention is described below with reference to FIG. 5. The values of $G_1$ and $G_2$ inherent in the pulse multipliers 91 and 97 and the divider 93 may be set as appropriate from the outside of the servo loop by, for example, manipulation with the operating unit shown in FIG. 3. First suppose that command pulses are applied to the system. The number of input command pulses is multiplied by $G_1$ in the pulse multiplier 91 and stored in a register $R_1$ (not shown) provided in the position control unit shown in FIG. 5. The number of position-related feedback pulses from the encoder 96 is multiplied by $G_2$ in the pulse multiplier 97 and stored in a register $R_2$ (not shown) also provided in the position control unit. The difference $R_3$ between the values of registers R and $R_2$ is computed by the deviation counter 92 and added to the previous value of $R_3$ stored in a register $R_3$ (not shown) also provided in the position control unit. The sum is stored as a deviation in the register $R_3$. The value of deviation $R_3$ is divided by $G_2$ in the divider 93 and the result is stored in a register $R_4$ (not shown) also provided in the position control unit. The value of register $R_4$ is delivered as an output to the servo amplifier 94 and the servo motor 95 is driven in accordance with the value of register $R_4$.

These steps of operation are repeated until the motor-driven object 99 is controlled to the position associated with the input command pulses.

In a certain case such as where the motor-driven object is a moving table, very fine adjustments may be achieved by adopting a basic design such that the table is moved in 10-mm increments per $10^4$ pulses. However, in practice, the precision of mechanical working on pinion and rack or other moving parts may be such that the motor-driven object is sometimes moved to a position slightly offset from the target position. In order to correct this offset, the command pulse rate or the position-related feedback pulse rate may be altered. In accordance with the conventional system shown in FIG. 7, the feedback pulse rate can be altered only discretely to take on such values as 1, 2 and 4 over a very narrow range, thereby making it difficult to achieve fine adjustments of the motor-driven object. Further, a change in the position-related feedback pulse rate can potentially cause variations in the loop gain, thereby instabilizing the servo system.

In contrast, the second embodiment of the present invention is such that the amount of movement per pulse is set with $G_1/G_2$ (the ratio between the multiplication factors of the command and feedback pulses) being selected for a very small change as exemplified by 999/1000, whereby the position of the motor-driven object can be finely adjusted. If desired, the amount of movement per pulse may be set to either a large or small value with $G_1/G_2$ being selected for a great change as exemplified by 100/1 or 1/100. In short, the pulse rate for controlling the position of the motor-driven object can be varied over a broad range from a very small value to a large one.

Further, in accordance with the present invention, the feedback pulses are multiplied by a factor of $G_2$ for computing the deviation from the command pulses and this effectively insures that the resolution by the encoder 96 will not deteriorate. As another advantage, the feedback pulses are multiplied by $G_2$ but, at the same time, the output of the deviation counter 92 is divided by $G_2$ in the divider 93 and, hence, the servo system will operate in a stable manner even if $G_2$ is set to any desired value. The reason for this advantage is described more specifically below.

FIG. 6 is a block diagram that models the operation of a motor control apparatus according to the second embodiment of the present invention. In FIG. 6, X(s) denotes the command position, Y(s) denotes the output position, and Kp denotes the position-associated loop gain. The servo amplifier attains a more satisfactory frequency band than the deviation counter and is denoted by the block having gain $\times 1$. The transfer function P(s) of the position control loop under discussion may be expressed by:

$$P(s) = \frac{Kp \times \frac{1}{G_2} \times \frac{1}{S}}{1 + \left(Kp \times \frac{1}{G_2} \times \frac{1}{S}\right) \times G_2} \tag{1}$$

By rearrangement of equation (1), we obtain $$P(s) = \frac{\frac{1}{S} \times \frac{Kp}{G_2}}{1 + \frac{1}{S} \times Kp}$$

The stability of the servo system can be evaluated by the magnitude of the denominator of the right side of equation (2). Substituting $1/G_2$ into equation (1), $G_2$ is eliminated from the denominator of equation (2). This means that $G_2$ is negligible and the position control servo system will remain stable even if the value of $G_2$ is changed greatly.

With the conventional motor control apparatus shown in FIG. 7, it is also desirable that the factor of multiplication $G_2$ by the second pulse multiplier 65 is related to the value 1/C of the divider 53 by the equation $1/D = 1/G_2$. With this relationship, $G_2 \times 1/G_2$ is equal to unity and the open loop transfer function of position control remains unchanged with respect to $G_2$, eliminating the problem that the controllability of the motor is affected by the change of $G_2$. However, if one attempts to relate the multiplication factor $G_2$ of the second pulse multiplier 65 to the value 1/C of the divider 53 in a system like the conventional motor control apparatus shown in FIG. 7 which has the position control unit 50, etc. composed of an ASIC, the configuration of the ASIC will become so complicated as to increase the cost of the overall system. Under these circumstances, the second pulse multiplier 65 and the divider 53 in the conventional system have been configured as separate circuits so that their respective parameters $G_2$ and 1/C are set by means of switches. However, this conventional motor control apparatus has had the disadvantage that the position controllability of the motor-driven object will be affected by the change in the multiplication factor $G_2$ of the second pulse multiplier 65.

In summary, the present invention offers the following advantages First, $G_1/G_2$, or the ratio between the factors of multiplication of the command pulses and the feedback pulses from the encoder, can be set at any desired value over a broad range starting with a very small value and ending with a large value. As a result, the pulse rate for controlling the position of the motor-driven object can be varied over a broad range from a very small value to a large one.

Second, the feedback pulses are multiplied by $G_2$ for computing the deviation from the command pulses and this effectively insures that the resolution by the encoder will not deteriorate. Further, the feedback pulses are multiplied by $G_2$ but, at the same time, the output of the deviation counter is divided by $G_2$ in the divider and, hence, the servo system will operate in a stable manner even if $G_2$ is set to any desired value.

Third, the feed-forward loop is branched at a stage following the first pulse multiplier and it becomes possible to obtain a motor control apparatus that has a good response characteristic in that a change in the multiplication factor, $G_1$ of the first pulse multiplier will not affect the ratio of the amount of feed-forward to a command signal.

Fourth, the first divider having the value $1/G_2$ is provided at a stage following the deviation counter and, at the same time, the second divider having the value $1/G_2$ is provided within the feed-forward loop. By inserting the first and second dividers in this way, the multiplication factor $G_2$ of the second pulse multiplier can be related to $1/G_2$, or the value preset for each of the first and second dividers. As a result, a change in $G_2$ will in no way affect the ratio of the amount of feed-forward to the command signal, thereby preventing the unwanted change in the position controllability of the motor-driven object that could otherwise occur in response to the change in $G_2$.

What is claimed is:

1. A motor control apparatus comprising:
   a first pulse multiplier for multiplying command pulses by a first factor;
   encoder for detecting a position of a motor-driven object;
   a second pulse multiplier for multiplying a detection pulse from said encoder circuit by a second factor;
   a deviation counter for detecting a difference between output pulses of said first and second multipliers;
   a divider for dividing an output signal of said deviation counter by said second factor; and
   a driving source driven by said control apparatus in accordance with an output of said divider.

2. A motor control apparatus comprising:
   a command counter for counting command pulses and outputting a counted value;
   a first pulse multiplier for multiplying an output of said command counter by a first factor;
   an encoder for detecting a position of a motor-driven object;
   a feedback counter for counting detection pulses of said encoder and outputting a counted value;
   a second pulse multiplier for multiplying said counted value signal of said feedback counter by a second factor;
   a deviation counter for detecting a difference between output signals of first and second multipliers;
   a first divider for dividing an output signal of said deviation counter by said second factor;
   a second divider for dividing an output signal of said first pulse multiplier by said second factor;
   an adder for adding said output signal of said first divider to an output signal of said second divider and for outputting a speed command; and
   a drive amplifier for controlling a motor connected to said motor-driven object in accordance with said speed command.

3. A motor control apparatus as claimed in claim 2, further comprising:
   first computing means for multiplying said countered value of said first divider by a first constant; and
   second computing means for multiplying said output signal of said second divider by a second constant.

4. A motor control apparatus as claimed in claim 2, further comprising:
   first sampling means for finding a difference of said counted value of said command counter at each of a plurality of predetermined time intervals; and
   second sampling means for finding a different of said counted value of said feedback counter at each of a plurality of predetermined time intervals.

5. A motor control apparatus as claimed in claim 2, wherein said drive amplifier includes:
   a subtractor for outputting an output signal of a difference between said speed command and a feedback signal of said feedback counter;
   a speed detecting operational amplifier for outputting a current command signal by performing an arithmetic operation on said output signal of said subtractor, and
   a current detecting operational amplifier and PWM section for performing an arithmetic operation on an applied voltage for a motor connected to said motor-driven object in accordance with said output current command signal, and converting an applied voltage to an output voltage with a duty cycle corresponding to said applied voltage.

6. A motor control apparatus as claimed in claim 5, further comprising:
   third computing means for multiplying by a third constant said speed signal for said motor connected to said motor driven object, said speed signal detected by said feedback signal of said feedback counter and for supplying a multiplied speed signal to said subtractor.

7. A motor control apparatus as claimed in claim 6, wherein said speed detecting operational amplifier receives a difference signal between said speed command signal and said multiplied speed signal, performs an arithmetic operation on said difference signal, and outputs said current command signal to said current detecting operation amplifier and PWM section.

8. A motor control apparatus as claimed in claim 5, wherein said current detecting operational amplifier and PWM section receives said current command signal from said speed detecting operation amplifier, performs an arithmetic operation on said applied voltage for said motor connected to said motor-driven object in accordance with said input current command signal, converts said applied voltages to a corresponding duty cycle, and supplies a converted signal to said motor connected to said motor driven object.

* * * * *